US012630009B2

(12) United States Patent
Barnes

(10) Patent No.: US 12,630,009 B2
(45) Date of Patent: May 19, 2026

(54) TRANSFER FUEL TANK

(71) Applicant: SuperTanks LLC, Idaho Falls, ID (US)

(72) Inventor: Jonathon W. Barnes, Idaho Falls, ID (US)

(73) Assignee: Supertanks LLC, Idaho Falls, ID (US)

( * ) Notice: Subject to any disclaimer, the term of this patent is extended or adjusted under 35 U.S.C. 154(b) by 0 days.

(21) Appl. No.: 18/538,570

(22) Filed: Dec. 13, 2023

(65) Prior Publication Data

US 2025/0196623 A1     Jun. 19, 2025

(51) Int. Cl.
B60K 15/03          (2006.01)
B60K 15/077         (2006.01)
F02M 37/00          (2006.01)

(52) U.S. Cl.
CPC ....... B60K 15/077 (2013.01); F02M 37/0082 (2013.01); B60K 2015/0777 (2013.01)

(58) Field of Classification Search
CPC ..... B60K 2015/03473; F02M 37/0017; F02M 37/0076; F02M 37/0082; F02M 37/0094; F02M 37/04; Y10T 137/86348
USPC ........................... 222/464.7, 321.5; 137/590
See application file for complete search history.

(56) References Cited

U.S. PATENT DOCUMENTS

| | | | | |
|---|---|---|---|---|
| 2,691,510 A | * | 10/1954 | Manville | A47L 15/4418 261/78.2 |
| 4,187,875 A | * | 2/1980 | Flynn | 261/78.2 |
| 5,394,902 A | * | 3/1995 | Shibao | B60K 15/077 137/565.17 |
| 5,464,129 A | * | 11/1995 | Ho | B05B 15/30 222/464.7 |
| 2007/0272696 A1 | * | 11/2007 | Kallevig | B60K 15/04 220/562 |
| 2013/0284749 A1 | * | 10/2013 | Schwark | B60K 15/03 220/563 |
| 2015/0102038 A1 | * | 4/2015 | Anderson | B60K 15/073 220/562 |
| 2015/0320178 A1 | * | 11/2015 | Fish | F16B 1/00 222/1 |
| 2017/0029045 A1 | * | 2/2017 | Anderson | B62D 43/02 |
| 2020/0114754 A1 | * | 4/2020 | Beysel | B29C 41/46 |

* cited by examiner

*Primary Examiner* — Allan D Stevens
(74) *Attorney, Agent, or Firm* — Schmeiser, Olsen & Watts LLP

(57)          ABSTRACT

A transfer fuel tank is provided. The transfer fuel tank includes a tank body having an inner volume and a fill tube coupled to a top surface of the tank body. The transfer fuel tank additionally includes at least one baffle support extending from a side of the tank body into the inner volume of the tank body, a pickup tube support formed in a bottom surface of the tank body, and a strengthening channel formed in the top surface of the tank body. The strengthening channel is sized and shaped to receive a pipe fitting for a transfer pump, wherein the strengthening channel runs alongside the fitting and the pump to provide rigidity to this area of the tank body to support the transfer pump.

4 Claims, 12 Drawing Sheets

TRANSFER FUEL TANK

BACKGROUND OF THE INVENTION

Technical Field

This invention relates generally to a fuel tank and more particularly to a transfer fuel tank for mounting in a truck bed.

State of the Art

Truck owners often have need for portable liquid storage such as storage for extra fuel, and the like. When the owner needs extra fuel for the truck itself, having a way to store the fuel in the bed of a truck is very convenient. This is typically done by coupling an extra fuel tank within the bed of the truck, wherein the user can access the fuel with a pump and a nozzle to dispense the fuel.

However, the conventional spare fuel tanks have limitations. For example, many conventional spare fuel tanks are limited in size if they are strong or have weaknesses if they are large volume spare fuel tanks. Additionally, the conventional spare fuel tanks may include a transfer pump that is coupled thereto and the conventional spare fuel tanks lack the rigidity to properly support the transfer pump. These tanks also lack other support structures for rigidity and to supporting a pickup tube.

Accordingly, there is a need for a transfer fuel tank for mounting in a truck bed that includes components that provide rigidity that supports the tank structure, supports a transfer pump and supports a pickup tube.

SUMMARY OF THE INVENTION

An embodiment includes a transfer fuel tank comprising: a tank body having an inner volume; a fill tube coupled to a top surface of the tank body; and a strengthening channel formed in the top surface of the tank body, the strengthening channel is sized and shaped to receive a pipe fitting for a transfer pump, wherein the strengthening channel runs alongside the fitting and the pump to provide rigidity to this area of the tank body to support the transfer pump.

Another embodiment includes a transfer fuel tank comprising: a tank body having an inner volume; a fill tube coupled to a top surface of the tank body; a pickup tube support formed in a bottom surface of the tank body; and a strengthening channel formed in the top surface of the tank body, the strengthening channel is sized and shaped to receive a pipe fitting for a transfer pump, wherein the strengthening channel runs alongside the fitting and the pump to provide rigidity to this area of the tank body to support the transfer pump.

Yet another embodiment includes a transfer fuel tank comprising: a tank body having an inner volume; a fill tube coupled to a top surface of the tank body; at least one baffle support extending from a side of the tank body into the inner volume of the tank body; a pickup tube support formed in a bottom surface of the tank body; and a strengthening channel formed in the top surface of the tank body, the strengthening channel is sized and shaped to receive a pipe fitting for a transfer pump, wherein the strengthening channel runs alongside the fitting and the pump to provide rigidity to this area of the tank body to support the transfer pump.

The foregoing and other features and advantages of a present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a transfer fuel tank for mounting in a truck bed that includes components that provide rigidity that supports the tank structure, supports a transfer pump and supports a pickup tube.

An embodiment of a transfer fuel tank 10 is depicted in FIGS. 1A-6. The transfer fuel tank 10 may be formed of a plastic material and may be manufactured through conventional molding processes. Because of the plastic material that the transfer fuel tank 10 is formed of, strength is an important feature of the transfer fuel tank 10. Because of the need for added strength, channels and recesses (not numbered) are located all over a tank body 12 of the transfer fuel tank 10 to provide added support and strength.

Figure 1A:
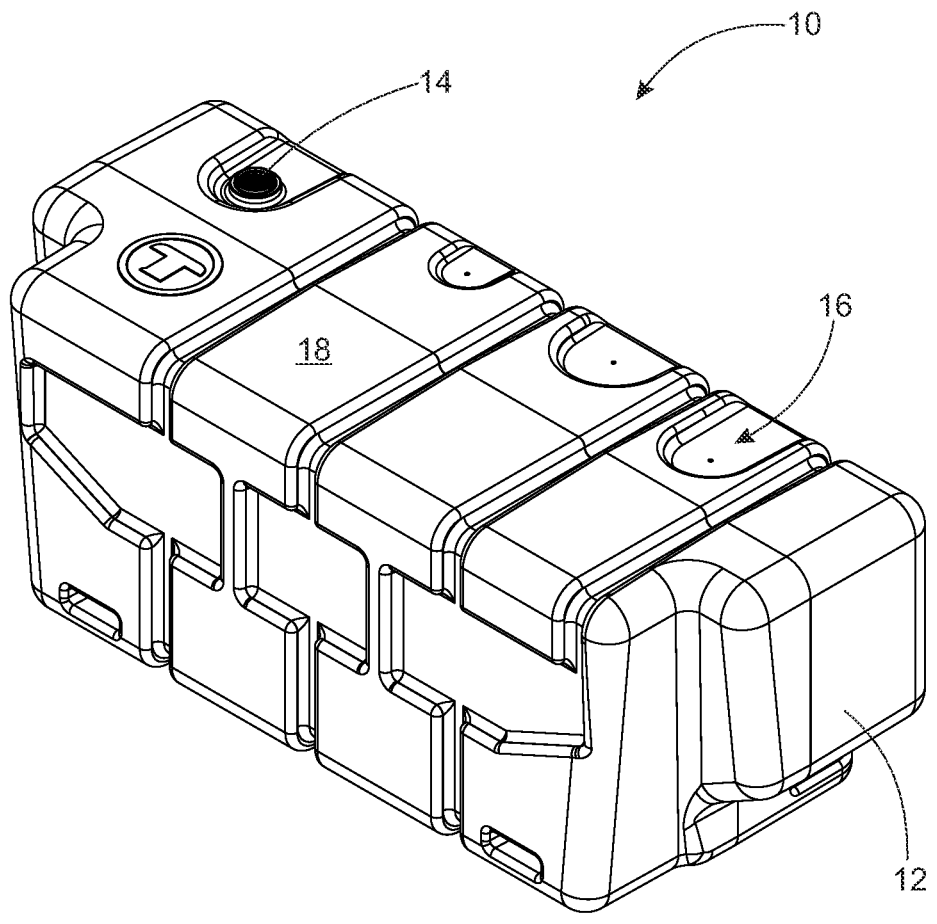
FIG. 1A is a perspective view of a transfer fuel tank according to an embodiment.
Figure 1B:
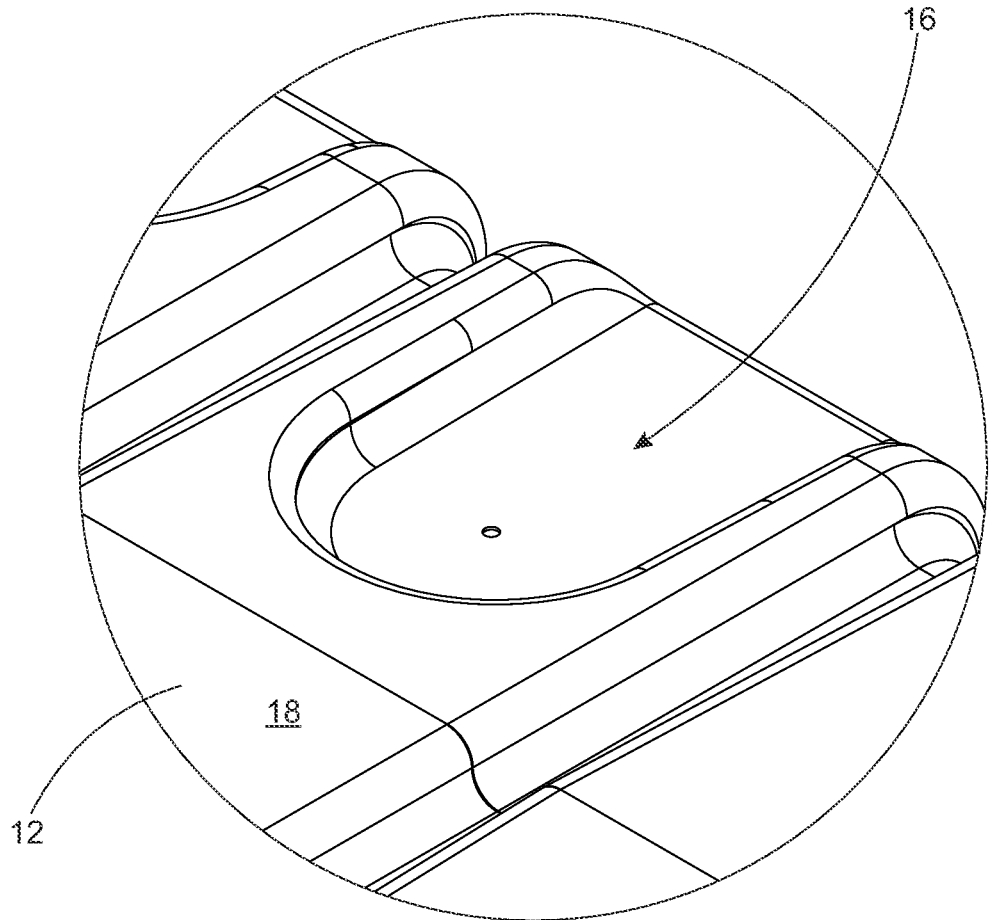
FIG. 1B is a zoomed in partial perspective view of a transfer fuel tank according to an embodiment.
Figure 2A:
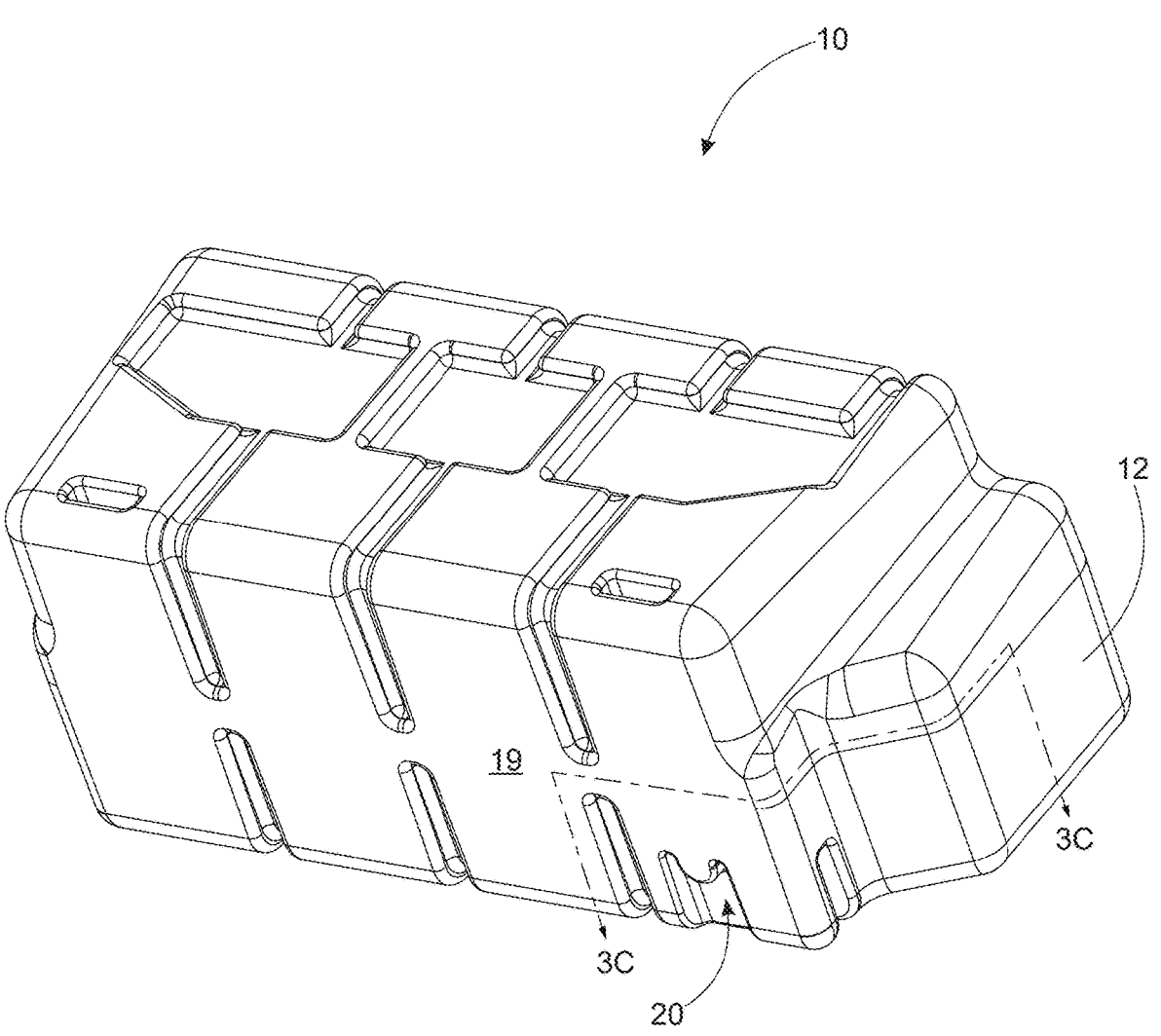
FIG. 2A is a perspective view of a transfer fuel tank according to an embodiment.
Figure 2B:
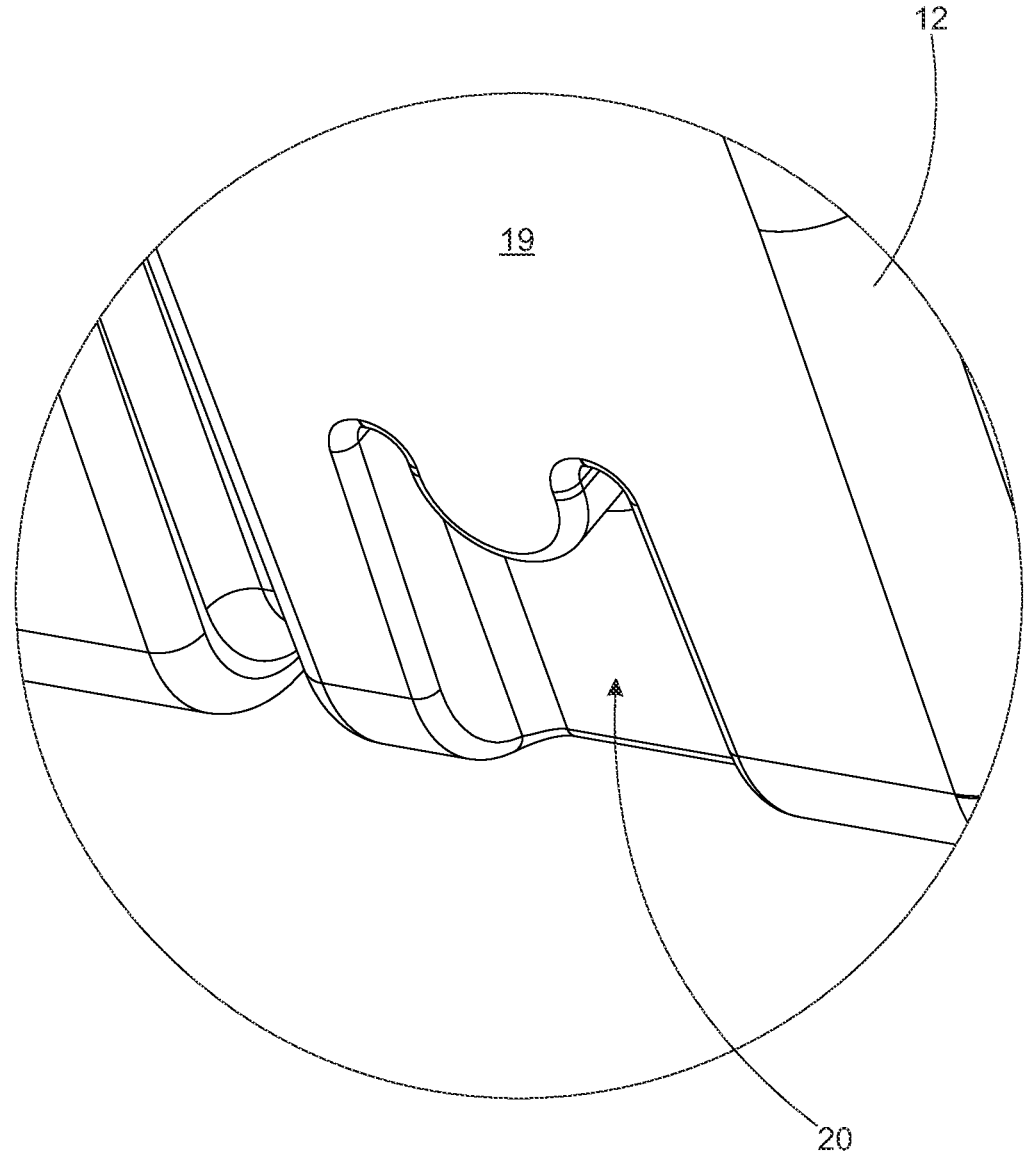
FIG. 2B is a zoomed in partial perspective view of a transfer fuel tank according to an embodiment.

Referring specifically to FIGS. 1A and 1B, the transfer fuel tank 10 includes a tank body 12 having an inner volume 40 (See FIG. 6), a fill tube 14 and a strengthening channel 16 formed in a top surface 18 of the tank body 12. The strengthening channel 16 is sized and shaped to receive a pipe fitting, such as, but not limited to a 2-inch National Pipe Taper ("NPT") fitting for a transfer pump (not shown). This strengthening channel 16 provides added strength that runs alongside the fitting and the pump to provide rigidity to this area of the tank body 12 to better support the transfer pump.

Figure 3A:
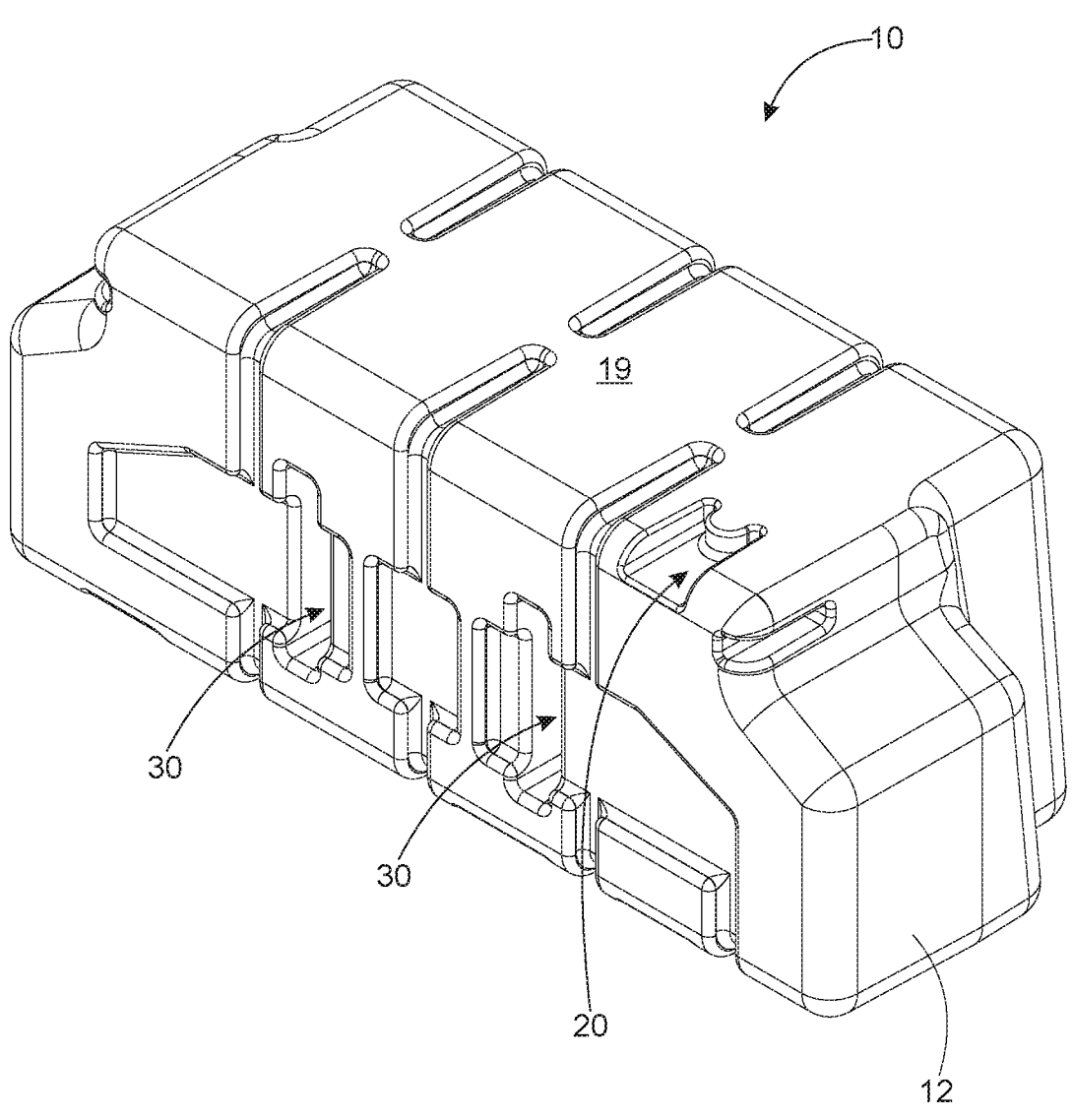
FIG. 3A is a perspective view of a transfer fuel tank according to an embodiment.
Figure 3B:
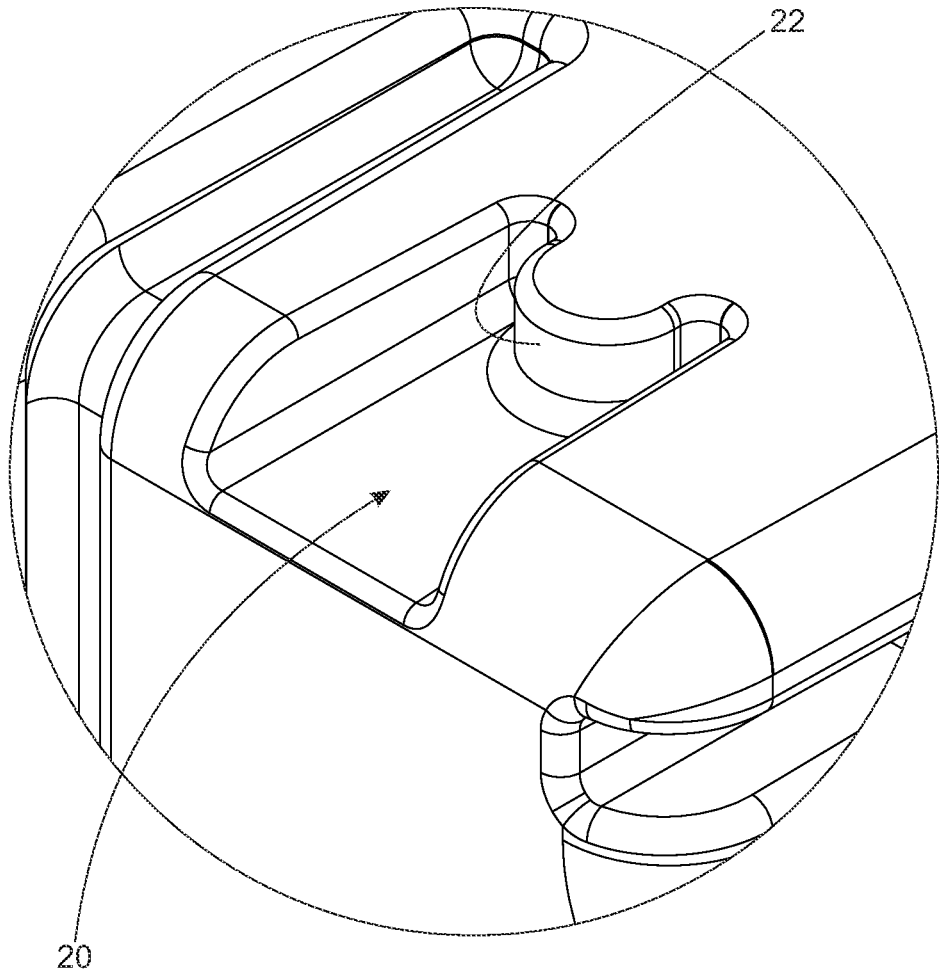
FIG. 3B is a zoomed in partial perspective view of a transfer fuel tank according to an embodiment.
Figure 3C:
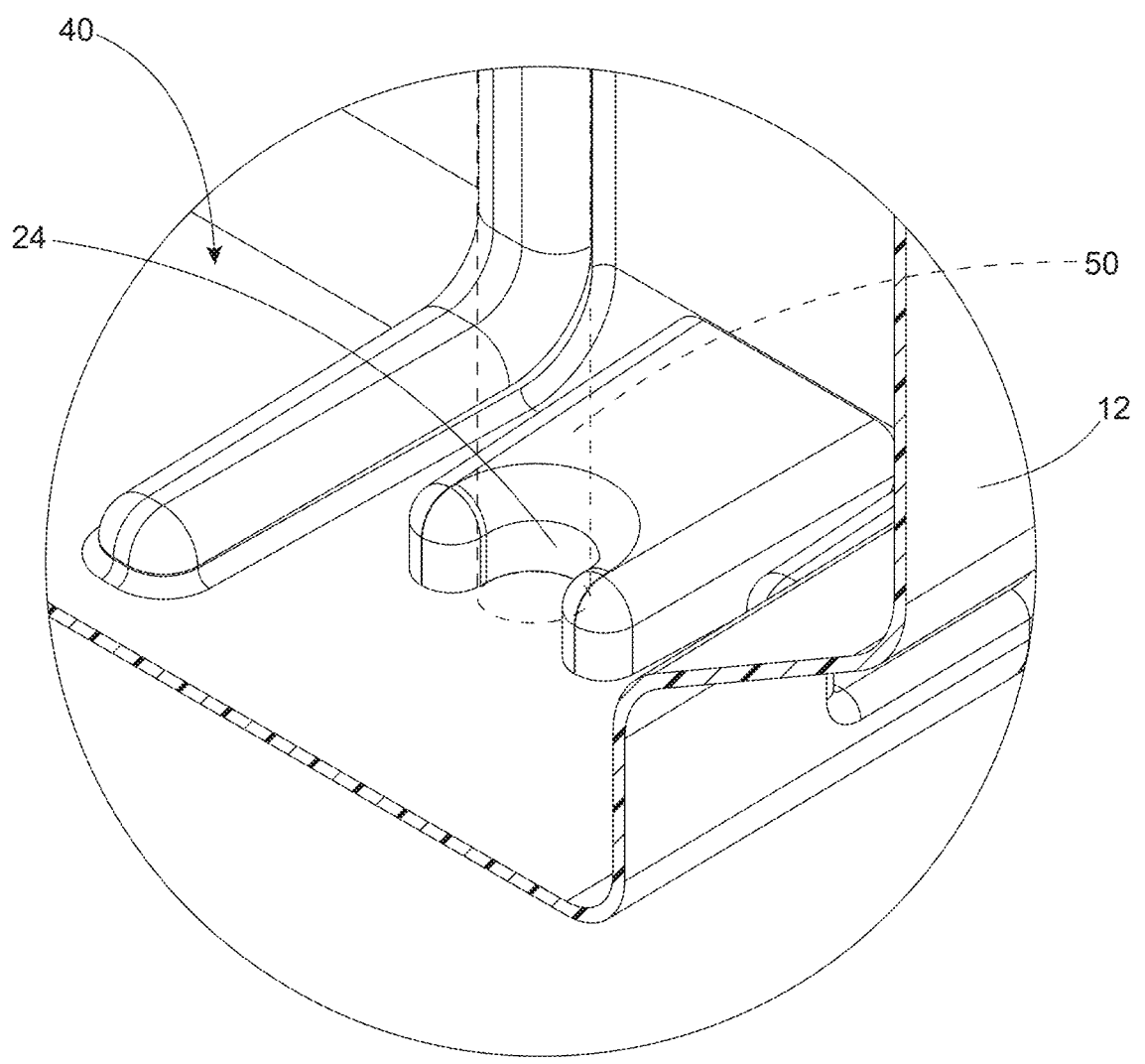
FIG. 3C is a zoomed in partial perspective section view of a transfer fuel tank taken along section line 3C-3C of FIG. 2A according to an embodiment.
Figure 4A:
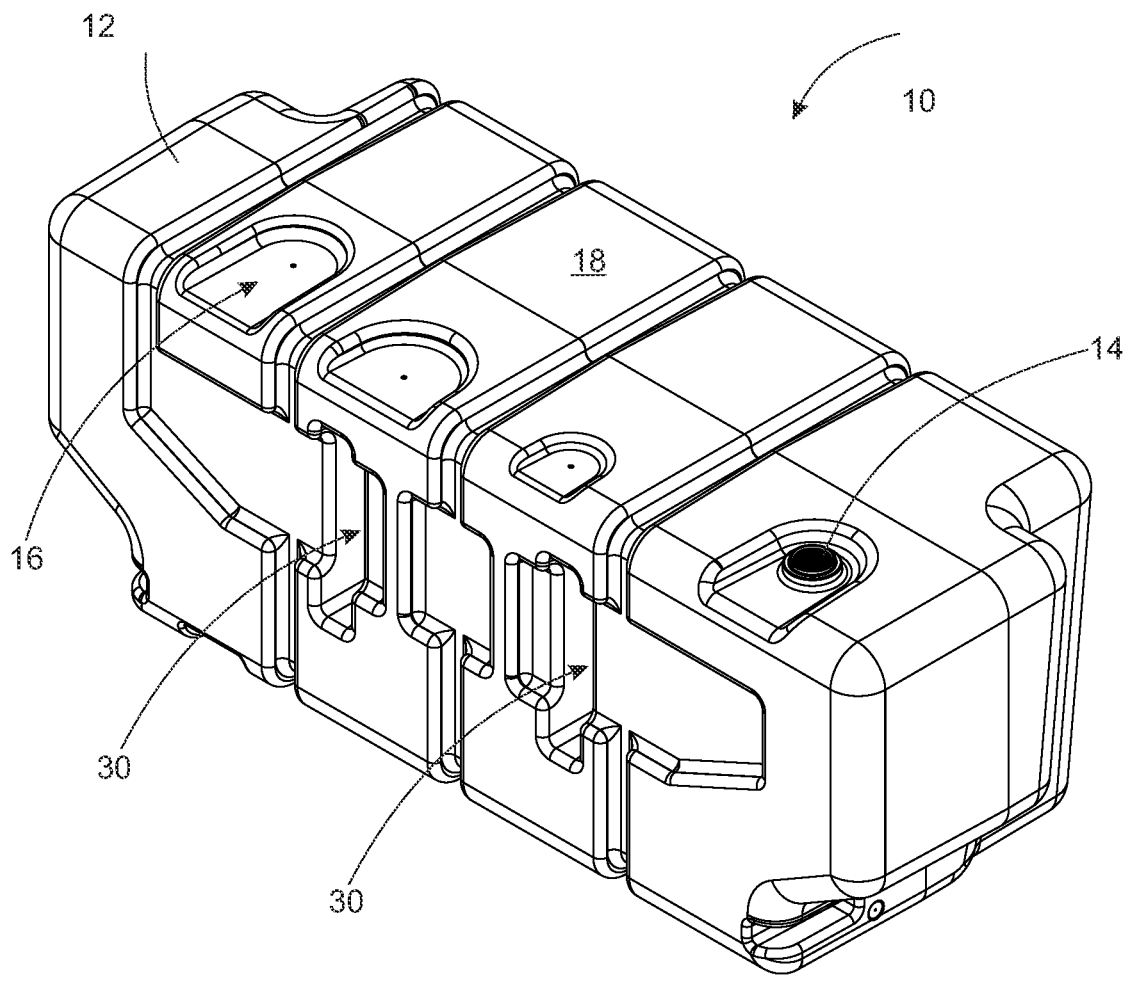
FIG. 4A is a perspective view of a transfer fuel tank according to an embodiment.
Figure 4B:
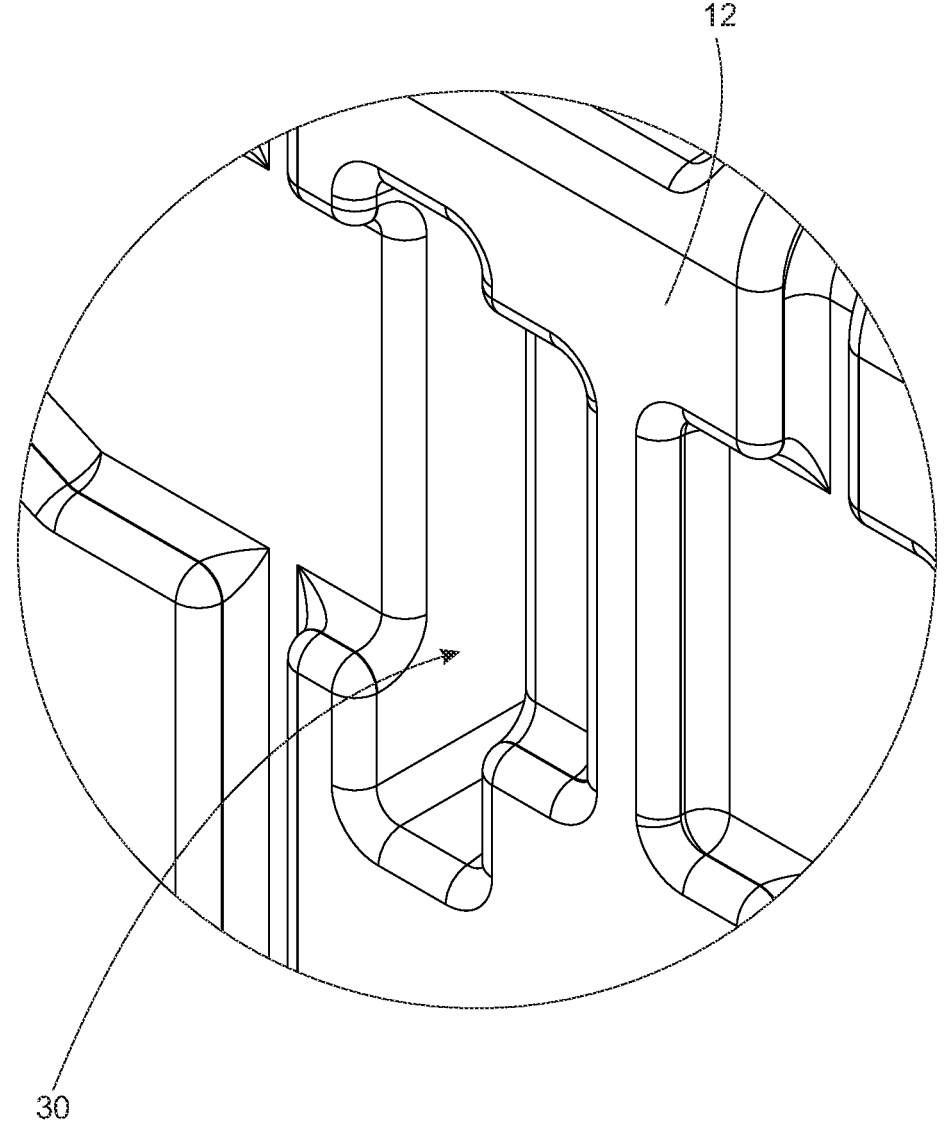
FIG. 4B is a zoomed in partial perspective view of a transfer fuel tank according to an embodiment.
Figure 5A:
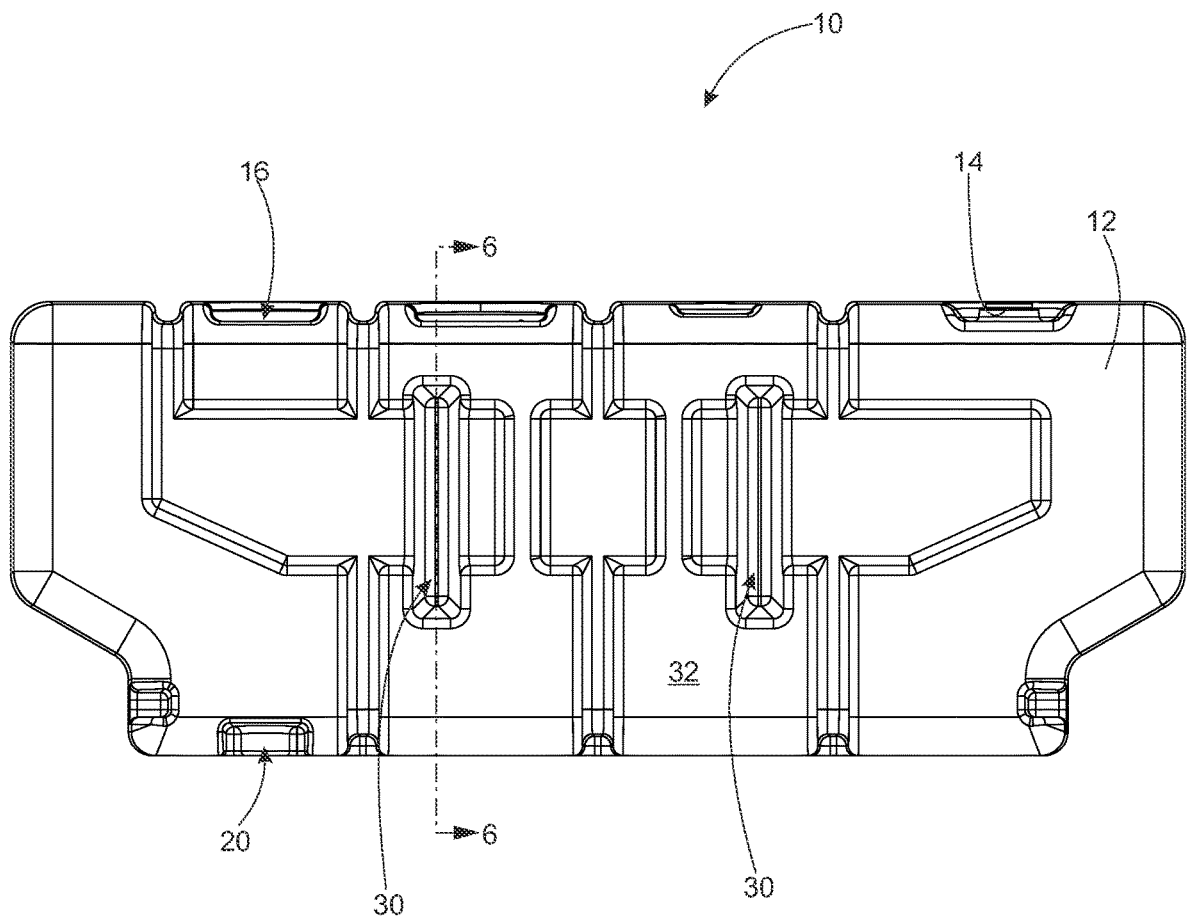
FIG. 5A is a rear view of a transfer fuel tank according to an embodiment.
Figure 5B:
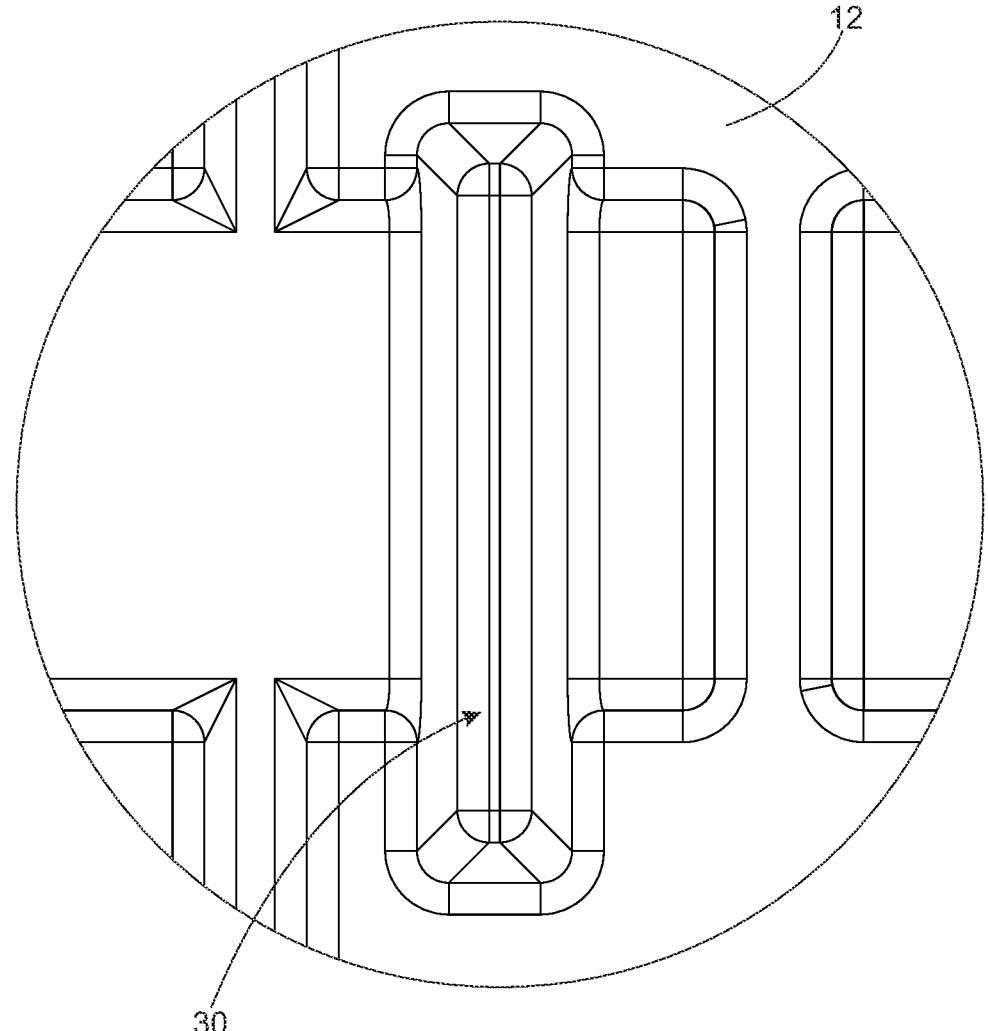
FIG. 5B is a zoomed in partial perspective view of a transfer fuel tank according to an embodiment.
Figure 6:
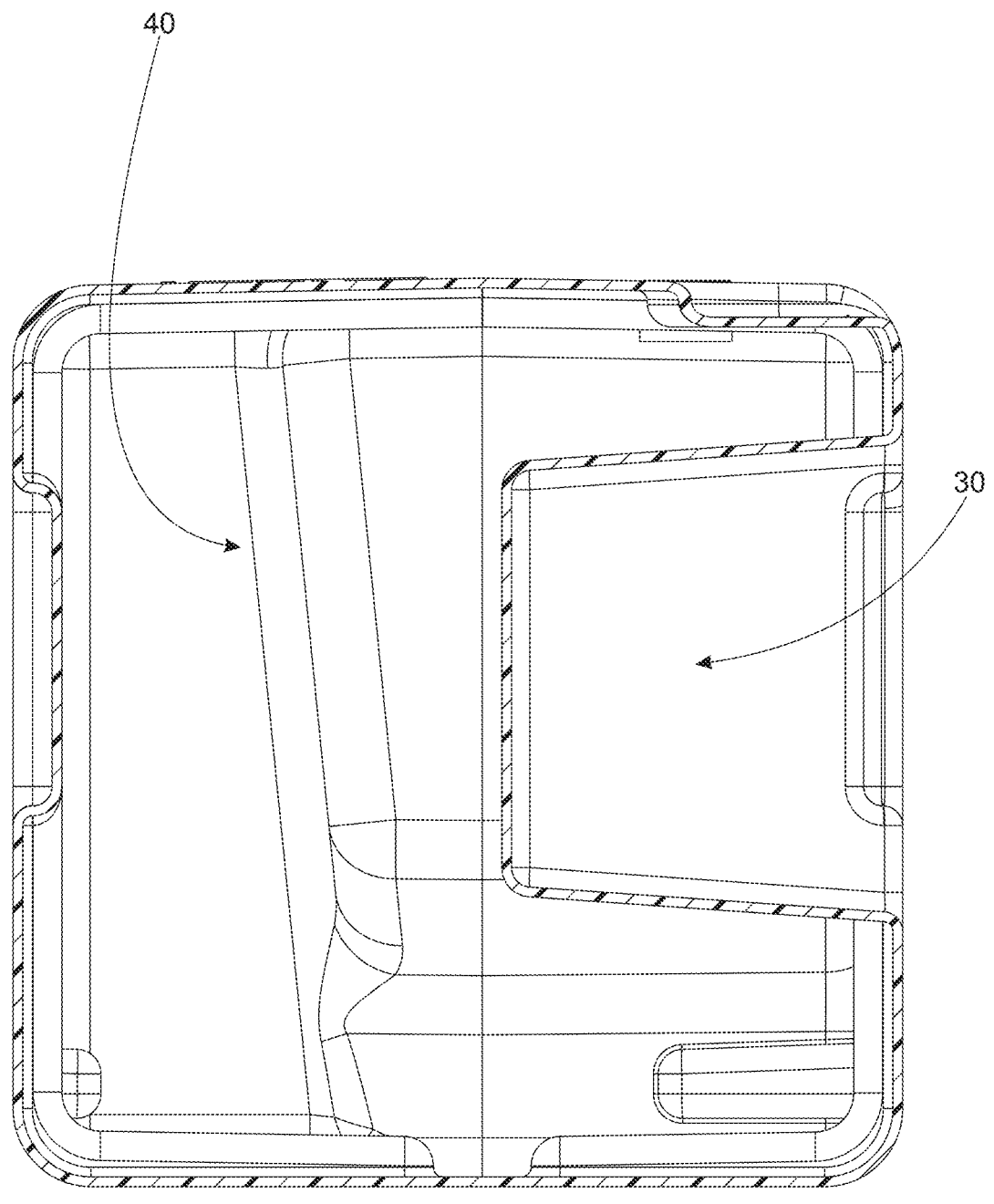
FIG. 6 is a section view of a transfer fuel tank taken along section line 6-6 depicted in FIG. 5A according to an embodiment.

Referring specifically to FIGS. 2A-3C, the tank body 12 may further include a pickup tube recess 20 formed in a bottom surface 19 of the tank body 12. The pickup tube recess 20 includes a rounded end 22 that forms a pickup tube support 24 located on an interior of the tank body 12, as shown in FIG. 3C. In embodiments, as shown, the pickup tube support 24 is a half cylinder. In operation, the pickup tube 50 that is coupled to the transfer pump (not shown) may be received within the pickup tube support 24 and that limits movement of the pickup tube 50 in three directions. Further, the weight of the transfer pump is applied in an axial direction down the pickup tube 50 with the pickup tube support 24 operating to stabilize the transfer pump instead of causing it to vibrate loose as often occurs in conventional fuel tanks.

Referring specifically to FIGS. 4A-6, the tank body includes baffle supports 30. The baffle supports 30 extend from a rear surface 32 of the tank body 12 and into the inner volume 40. The baffle supports 30 are a tapered shape on all sides and extend from a wider opening at the rear surface 32 and a narrower cross-section than the opening at the closed end of the baffle support 30 that is extended within the inner volume 40 of the tank body 12. The baffle supports 30 perform two functions. The first function is to operate as a baffle within the inner volume 40 to inhibit fuel slosh. The second function is to provide additional support as the support features of the tank body 12 are extended across the baffle supports 30 and the tapered shape of the baffle supports 30. These baffle supports 30 are thereby configured to provide a multi-tier support feature that provides increased strength to the tank body 20 over tanks that do not have such baffle supports 30. These baffle supports 30 are in addition to all of the other channels and recesses (not numbered) located all over the tank body 20, these channels and recesses providing support and strength to the overall tank body 12.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A transfer fuel tank comprising:
   a tank body having an inner volume;
   a fill tube coupled to a top surface of the tank body, the fill tube providing access to the inner volume;
   a pickup tube coupled within the tank body;
   a pickup tube support formed in an interior side of a bottom surface of the tank body, the pickup tube support formed by a pickup tube recess formed in an outer side of the bottom surface, wherein the pickup tube support is a half cylinder formed by a rounded end of the pickup tube recess and receives an end of the pickup tube within the half cylinder and inhibits movement of the end of the pickup tube in at least three directions; and
   a strengthening channel formed in the top surface of the tank body, the strengthening channel is configured to receive a pipe fitting for a transfer pump, wherein the strengthening channel is configured to run alongside the fitting and the pump to provide rigidity to this area of the tank body configured to support the transfer pump.

2. The transfer fuel tank of claim 1, wherein the tank body is configured such that weight of the transfer pump applied in an axial direction down the pickup tube coupled within the pickup tube support configured to stabilize the transfer pump and configured to inhibit the transfer pump from vibrating loose.

3. The transfer fuel tank of claim 1, further comprising at least one baffle support extending from a side of the tank body into the inner volume of the tank body.

4. The transfer fuel tank of claim 3, wherein the baffle support inhibits fuel slosh of fuel within the inner volume and provides a multi-tier support to the tank body.

* * * * *